(12) United States Patent
Hadef

(10) Patent No.: US 9,279,886 B2
(45) Date of Patent: Mar. 8, 2016

(54) RECEIVING POSITIONING SIGNALS AT DIFFERENT FREQUENCIES

(71) Applicant: Samsung Electronics Co., Ltd., Gyeonggi-do (KR)

(72) Inventor: Mahmoud Hadef, Middlesex (GB)

(73) Assignee: Samsung Electronics Co., Ltd (KR)

( * ) Notice: Subject to any disclaimer, the term of this patent is extended or adjusted under 35 U.S.C. 154(b) by 464 days.

(21) Appl. No.: 13/761,904

(22) Filed: Feb. 7, 2013

(65) Prior Publication Data

US 2014/0062783 A1    Mar. 6, 2014

(30) Foreign Application Priority Data

Feb. 8, 2012   (RU) ................................. 2012104318
Jul. 16, 2012   (GB) .................................. 1212592.8

(51) Int. Cl.
*G01S 19/33* (2010.01)
*G01S 19/23* (2010.01)
*G01S 19/36* (2010.01)
*G01S 19/42* (2010.01)

(52) U.S. Cl.
CPC .................. *G01S 19/33* (2013.01); *G01S 19/23* (2013.01); *G01S 19/36* (2013.01); *G01S 19/42* (2013.01); *G01S 19/425* (2013.01)

(58) Field of Classification Search
CPC ......... G01S 19/33; G01S 19/32; G01S 19/36; G01S 19/425; G01S 19/42
USPC ....................................... 342/357.73, 357.72
See application file for complete search history.

(56) References Cited

U.S. PATENT DOCUMENTS

| | | | |
|---|---|---|---|
| 6,441,780 B1* | 8/2002 | Rog et al. ................. | 342/357.61 |
| 6,982,979 B2* | 1/2006 | Ofek et al. ................. | 370/395.1 |
| 7,095,368 B1 | 8/2006 | Van Diggelen | |
| 7,206,336 B1* | 4/2007 | Rog et al. ..................... | 375/150 |
| 8,018,379 B1 | 9/2011 | Sun et al. | |
| 2007/0273580 A1* | 11/2007 | Tekawy et al. ........... | 342/357.02 |
| 2010/0039321 A1* | 2/2010 | Abraham ................. | 342/357.12 |
| 2012/0319899 A1* | 12/2012 | Tangudu et al. ......... | 342/357.69 |

FOREIGN PATENT DOCUMENTS

| | | |
|---|---|---|
| EP | 2 239 858 | 10/2010 |
| EP | 2 330 442 | 6/2011 |
| GB | 2475407 | 5/2011 |
| WO | WO 2009/142981 | 11/2009 |

OTHER PUBLICATIONS

UK Search Report dated Oct. 25, 2012 issued in counterpart application No. 1212592.8.

* cited by examiner

*Primary Examiner* — Harry Liu
(74) *Attorney, Agent, or Firm* — The Farrell Law Firm, P.C.

(57) ABSTRACT

A method and a receiver for receiving positioning signals are disclosed. The positioning signals are received from a plurality of first sources in a first frequency range and from a plurality of second sources in a second frequency range different from the first frequency range. The receiver is switched between the first and second frequency ranges to receive the positioning signals, and the receiver obtains time offset information about a time taken to switch the receiver between the first and second frequency ranges, by obtaining a solution to a set of simultaneous equations based on combined navigation data for the first and second sources.

21 Claims, 4 Drawing Sheets

RECEIVING POSITIONING SIGNALS AT DIFFERENT FREQUENCIES

PRIORITY

This application claims priority under 35 U.S.C. §119(a) to a Russian Patent Application filed in the Russian Patent Office on Feb. 8, 2012 and assigned Serial No. 2012104318, and to a Great Britain patent application filed in the Great Britain Intellectual Property Office on Jul. 16, 2012, and assigned Serial No. 1212592.8, the entire disclosure of each of which is incorporated herein by reference.

BACKGROUND

1. Field of the Invention

The present invention generally relates to navigation systems, and more particularly, to receiving positioning signals at different frequency ranges, and obtaining information about a time taken to switch between the frequency ranges.

2. Description of the Related Art

Positioning systems, for example Global Navigation Satellite Systems (GNSS) such as the Global Positioning System (GPS) and the Global Orbiting Navigational Satellite System (GLONASS), enable the location of a receiver to be accurately determined. Such systems operate by transmitting navigation messages from a plurality of sources whose locations are known. The messages include information for identifying the time at which the message was sent, which enables the receiver to determine the travel time of the signal and hence the distance to the source. This distance is referred to as a pseudorange (PR). To calculate the receiver's location in three dimensions, signals from at least four satellites are required to calculate three spatial coordinates and a clock offset between the receiver and the satellite clocks, since the receiver normally incorporates a much less accurate clock than the atomic clocks used in the satellites.

To calculate its location, the receiver receives signals from any visible satellite, i.e. any one of the satellites to which there is a direct line-of-sight for the relevant frequency range. However, in some environments, such as built-up urban areas, surrounding topographical features may block the lines of sight to many of the satellites. In this case, the minimum number of satellites to obtain a position fix may not be visible. Accordingly, it is desirable to develop a dual-mode receiver that can use satellites from more than one navigation system to calculate its location. However, in such dual-mode receivers significant errors can be introduced due to the use of different systems; for example, as a result of having to switch between the different frequencies used in the different systems.

SUMMARY

The present invention has been made to address the above problems and disadvantages in the prior art, and to provide at least the advantages described below.

According to an aspect of the present invention, a method is provided for receiving positioning signals from a plurality of first sources in a first frequency range at a receiver, which includes switching the receiver to receive signals in a second frequency range different from the first frequency range, receiving positioning signals from a plurality of second sources in the second frequency range at the receiver, and obtaining time offset information about a time taken to switch the receiver between the first and second frequency ranges, by obtaining a solution to a set of simultaneous equations based on combined navigation data for the first and second sources.

According to another aspect of the present invention, there is also provided a computer-readable storage medium storing a computer program which, when executed on a processor, causes the processor to perform a method which includes receiving positioning signals from a plurality of first sources in a first frequency range at a receiver, which includes switching the receiver to receive signals in a second frequency range different from the first frequency range, receiving positioning signals from a plurality of second sources in the second frequency range at the receiver, and obtaining time offset information about a time taken to switch the receiver between the first and second frequency ranges, by obtaining a solution to a set of simultaneous equations based on combined navigation data for the first and second sources.

According to a further aspect of the present invention, a receiver for receiving positioning signals is provided. The receiver includes a receiving module for receiving positioning signals. The receiving module is arranged to receive the positioning signals from a plurality of first sources in a first frequency range and from a plurality of second sources in a second frequency range different from the first frequency range. The receiving module is switchable between the first and second frequency ranges. The receiver further includes a processing module for obtaining time offset information about a time taken to switch the receiver between the first and second frequency ranges, by obtaining a solution to a set of simultaneous equations based on combined navigation data for the first and second sources.

BRIEF DESCRIPTION OF THE DRAWINGS

The above and other aspects and features of the embodiments of the present invention will become more apparent from the following detailed description, with reference to the accompanying drawings, in which.

DETAILED DESCRIPTION OF EMBODIMENTS OF THE PRESENT INVENTION

Figure 1:
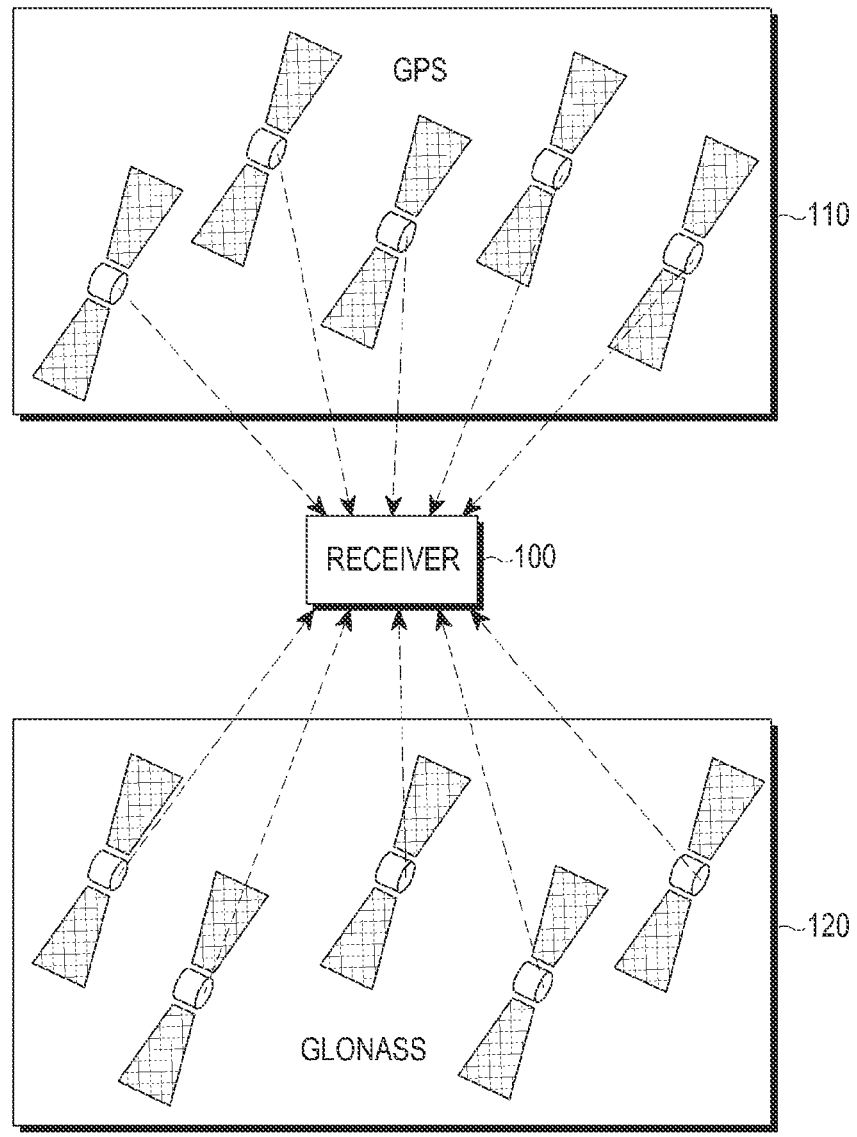
FIG. 1 illustrates a dual-mode receiver for receiving positioning signals from GPS and GLONASS systems, according to an embodiment of the present invention.

Referring now to FIG. 1, a dual-mode receiver 100 for receiving signals from different navigation systems is illustrated. In the present embodiment, the receiver 100 can be configured to receive signals from both GPS and GLONASS satellites, but in other embodiments other navigation systems may be used. Also, the receiver may not only be configured to receive signals from two navigation systems, but could receive signals from more than two navigation systems in some embodiments.

The GPS 110 and GLONASS 120 satellite navigation systems each include a plurality of satellites, which transmit navigation messages that can be received by the receiver 100. Each navigation message, which can also be referred to as a positioning signal, includes navigation data which can be extracted by the receiver and used to calculate the receiver's current location. The navigation data typically includes information about the time of transmission of the signal, according to an onboard clock of the satellite which is synchronized with clocks on other satellites in the system, as well as information to enable the receiver to determine the satellite's location at the time the message was sent. A person skilled in the art will appreciate that although in FIG. 1 five satellites are illustrated for each system, in general any navigation system may include any number of satellites.

Figure 2:
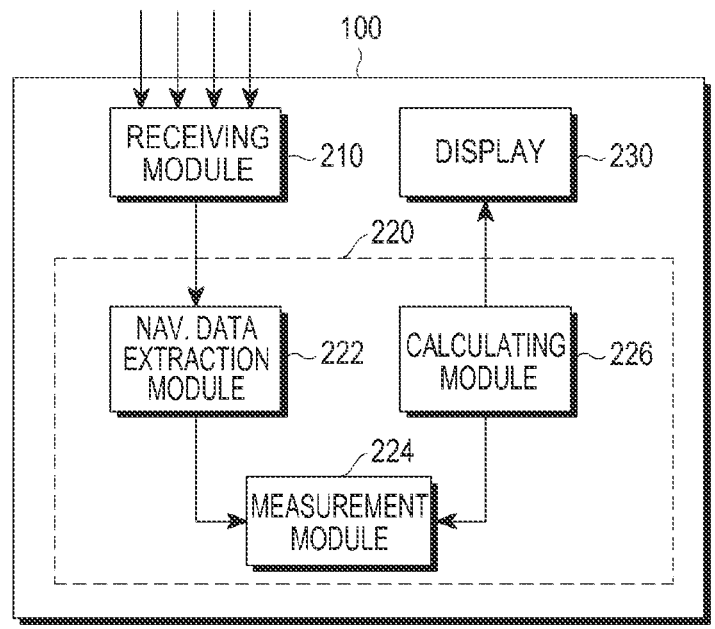
FIG. 2 illustrates a structure of a dual-mode receiver, according to an embodiment of the present invention.

An example of an internal structure of the receiver 100 is shown in FIG. 2. Although in FIG. 2 certain modules are illustrated for performing different functions, the present invention is not restricted to this structure. In some embodiments the modules may be implemented as physically separate hardware modules while in other embodiments they may be implemented as software modules executed on a common processor. Some or all of the functionality of one or more modules could be provided by a field programmable gate array (FPGA) or application-specific integrated circuit (ASIC) configured to perform the necessary functions.

Figure 3:
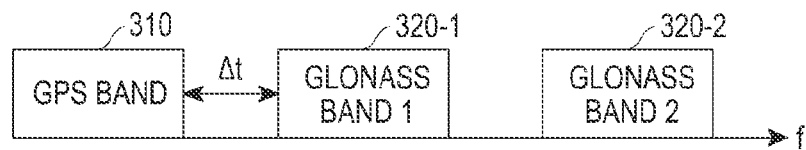
FIG. 3 illustrates frequency distribution of signals from the GPS and GLONASS systems.

Continuing with reference to FIG. 2, the receiver 100 includes a receiving module 210 which can receive positioning signals from a plurality of first sources and a plurality of second sources. In the present embodiment, the plurality of first sources are satellites within the GPS navigation system, and the plurality of second sources are satellites within the GLONASS navigation system. The receiving module 210 is switchable to receive positioning signals at different frequencies, since the GPS and GLONASS signals are transmitted in different frequency bands as shown in FIG. 3. That is, the same receiving module 210 can be configured to receive signals in a first frequency range, and can then be switched, i.e. reconfigured, to receive signals in a second frequency range different from the first frequency range.

The use of the same receiving module 210 to receive positioning signals from both navigation systems enables the cost and physical size of the receiver to be reduced in comparison to a design in which separate receiving modules are provided for each navigation system. However, a time taken to switch from the first frequency range to the second frequency range, $\Delta t$, could introduce significant positioning errors if not properly compensated for. Accordingly, in the present embodiment the receiver 100 is configured to obtain information about the time taken to switch the receiving module 210, and use this information to compensate the pseudoranges as appropriate before obtaining a position fix.

In more detail, the receiving module 210 receives the GPS and GLONASS positioning signals, which may be received either substantially simultaneously or at different times. The receiving module 210 sends the received GPS and GLONASS signals to a processing module 220, which obtains a position fix based on the received navigation signals and controls a display 230 to display information about the obtained location to a user.

The processing module 220 includes a navigation data extraction module 222 which processes I/Q data of the received signals to decode a received positioning signal and extract navigation data from each signal. The navigation data includes a time of transmission of the signal (I), and information about the satellite's position in terms of time and spatial coordinates ($T_s, X_s, Y_s, Z_s$), and satellite velocities ($V_x, V_y, V_z$). The navigation data extraction module 222 sends the navigation data to a measurement module 224, which calculates for each received signal a pseudorange PR from the corresponding satellite to the receiver 100. A Doppler shift estimate of the navigation signal carrier frequency PD can also be obtained.

Next, the pseudoranges obtained by the measurement module 224 are sent to a calculating module 226, which obtains a location of the receiver based on the pseudoranges. Furthermore, the calculating module 226 is also arranged to compensate for the switching time $\Delta t$ taken to switch the receiving module 210 between the first and second frequency bands, based on combined navigation data from signals received from both navigation systems. Here, the term "combined navigation data" refers to a set of navigation data that includes navigation data from the first sources, i.e. satellites in the GPS system, as well as navigation data from the second sources, i.e. satellites in the GLONASS system. The navigation data from the first sources may be referred to as first navigation data, and the navigation data from the second sources may be referred to as second navigation data, the combined navigation data including both the first and second navigation data.

Figure 4:
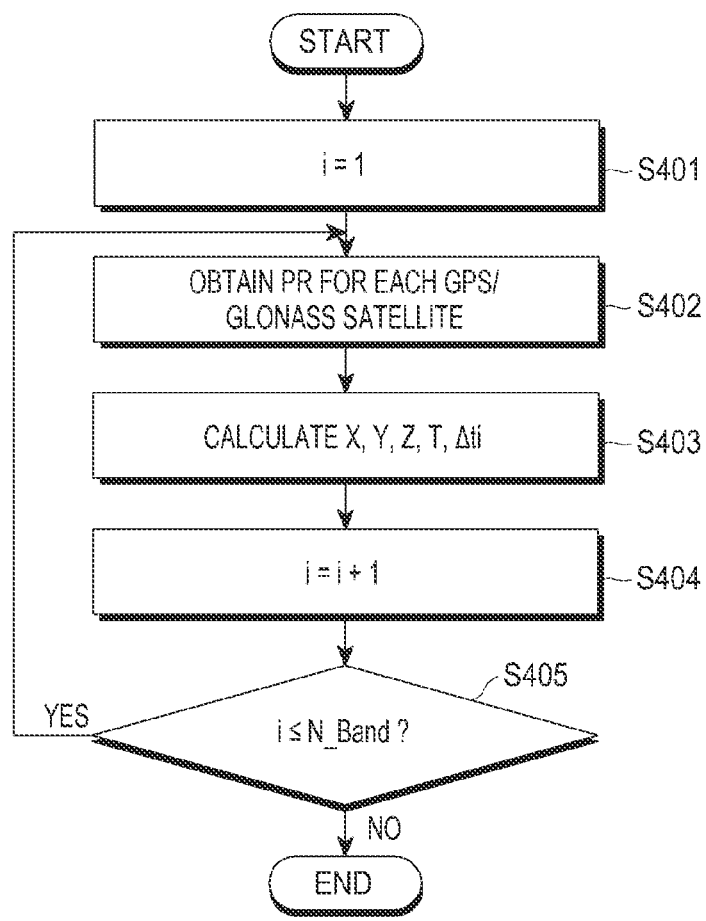
FIG. 4 illustrates a flowchart for obtaining a switching time taken to switch between first and second frequency bands in a receiver, according to an embodiment of the present invention.

A method of estimating the switching time is illustrated in FIG. 4. The method may be used to calibrate the receiver when dual-mode navigation is required, for example when an insufficient number of sources in a single navigation system are available. Different steps of the method may, for example, be executed in different ones of the modules of the receiver shown in FIG. 2. In some embodiments, all method steps of FIG. 4 could be executed in a general-purpose processor, executing a computer program arranged to cause the processor to execute the method.

First, in step S401, a counter i is set to 1. Here, i denotes a frequency band that is switched to by the receiver from an initial frequency band. For example, referring back to FIG. 3, the initial frequency band to which the receiver is tuned by default can be the GPS frequency band 310. The first switched band, i.e. i=1, can then be GLONASS band 1 320-1, and the second switched band, i.e. i=2, can be GLONASS band 2 320-2. That is, the method can be used in a dual-mode receiver where there is only a default band and a single switched band, in which case the number of switched bands N_Band=1, or the method can be used in a multi-mode receiver arranged to switch between any number of bands. Here, N_Band is equal to the number of times the receiver has to switch between bands, which will be one less than the total number of bands.

Then, in step S402, pseudoranges PR are obtained for each visible satellite in the default band, i.e. each GPS satellite, and each satellite in the $i^{th}$ switched band, i.e. each satellite in GLONASS band 1. Next, in step S403, the three spatial coordinates of the receiver X, Y, Z are obtained, as well as a time offset T and switching time for the $i^{th}$ switched band $\Delta t_i$, by obtaining the solution to a set of simultaneous equations. This differs from a conventional approach in that an additional variable, the switching time $\Delta t_i$, is included to account for the time taken to switch between the initial band and the $i^{th}$ switched band. As there are five variables when the receiver coordinates are to be obtained in three dimensions, a minimum total number of five pseudorange measurements are required. The minimum total number can be reduced to four if two-dimensional coordinates are to be obtained. Here, the total number refers to the combined number of sources available in the initial frequency band and the $i^{th}$ switched band. In the present embodiment, if the number of sources in the initial frequency band is N_GPS and the number of sources in the first switched band is $N\_GL_1$, the total minimum number of sources $N\_GPS+N\_GL_1$ for three-dimensional positioning is five.

In some embodiments, a starting value for the switching time $\Delta t_i$ may be obtained by experiment, for example during calibration of the receiver, and stored as an initial value to be used in obtaining the solution to the set of simultaneous equations. This step may help to speed up convergence on the solution, but could be omitted in embodiments where rapid convergence is not essential.

Once the solution has been obtained, the value of the switching time $\Delta t$ can be stored if required and used when obtaining subsequent position fixes. Alternatively, the calibration process to obtain $\Delta t_i$ can be repeated whenever a fix is required.

Also, in the present embodiment, a single switching time is obtained for the entire band. However, in some embodiments, improved accuracy may be possible by obtaining an individual switching time for each source within the band. For example, the GLONASS frequency bands include pluralities of adjacent channels, each used by a particular satellite for communication. The time taken to switch to each channel can be obtained and compensated for individually. As this approach is computationally more expensive and time-consuming, the individual switching delays may only be calculated in applications where a high level of accuracy is required.

Next, in step S404, the value of i is incremented by 1, and compared to the total number of switched bands N_Band in step S405. If other switched bands are remaining for which a switching time $\Delta t_i$ has not yet been calculated, the process returns to step S402 and repeats for the next band. If all bands have been processed, then the process ends.

Once a synchronization time $\Delta t_i$ has been obtained for the $i^{th}$ band, the receiver can compensate pseudoranges measured for sources within the $i^{th}$ band to provide more accurate positioning. For example, a pseudorange $PR_{i,j}$ for the $j^{th}$ source in the $i^{th}$ band can be adjusted to account for the time taken to switch to the $i^{th}$ band by subtracting a distance covered by the signal during the switching time. Alternatively, the pseudoranges to sources in the initial frequency band, i.e. the first sources, can be compensated instead by adding a corresponding term.

By enabling a switching time between different frequency ranges to be estimated and compensated, embodiments of the present invention can improve the positioning accuracy in dual-mode receivers. Testing has shown that positioning accuracy can be improved by 10-15 m by compensating switching errors using a method such as that shown in FIG. 4.

Figure 5:
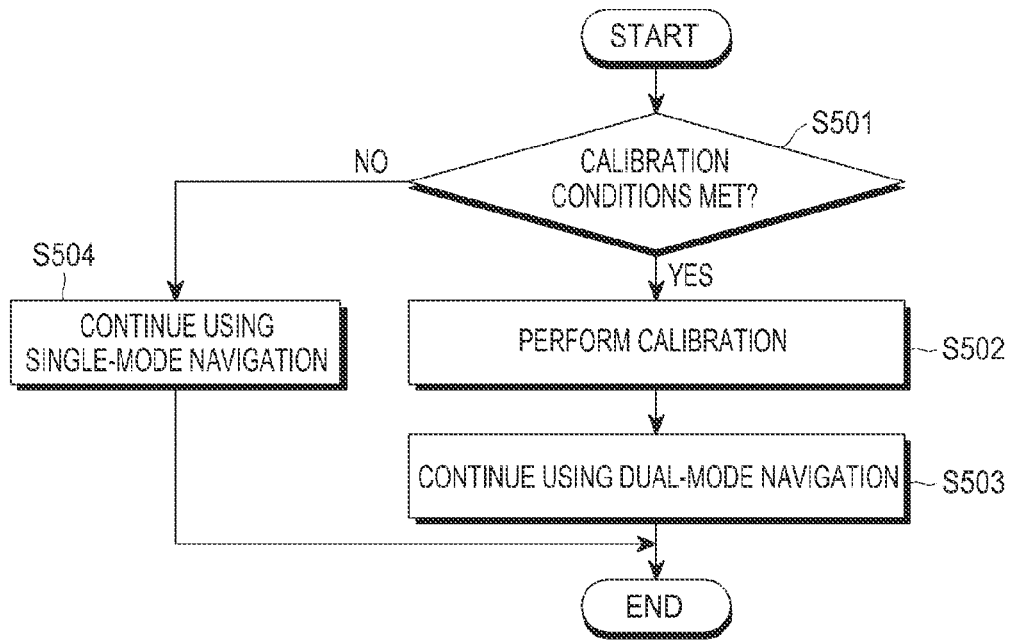
FIG. 5 illustrates a flowchart for determining whether to operate in dual-mode or single-mode, according to an embodiment of the present invention.

Referring now to FIG. 5, a method of determining whether to perform calibration is illustrated according to an embodiment of the present invention. In step S501, it is determined whether predetermined calibration conditions are met. The predetermined conditions are criteria that should be met in order for the switching time $\Delta t_i$ to be obtained. If the conditions are met, then in step S502 the calibration method of FIG. 4 is performed to obtain the switching time $\Delta t_i$, and in step S503 the receiver continues to subsequently obtain position fixes using dual-mode navigation. Alternatively, if the calibration conditions are not met, the receiver proceeds to step S504 and continues to operate using single-mode navigation. An alert message can be presented to the user if an insufficient number of sources are available in a single system, and dual-mode calibration is not possible, to inform the user that a position fix cannot be provided.

Figure 6:
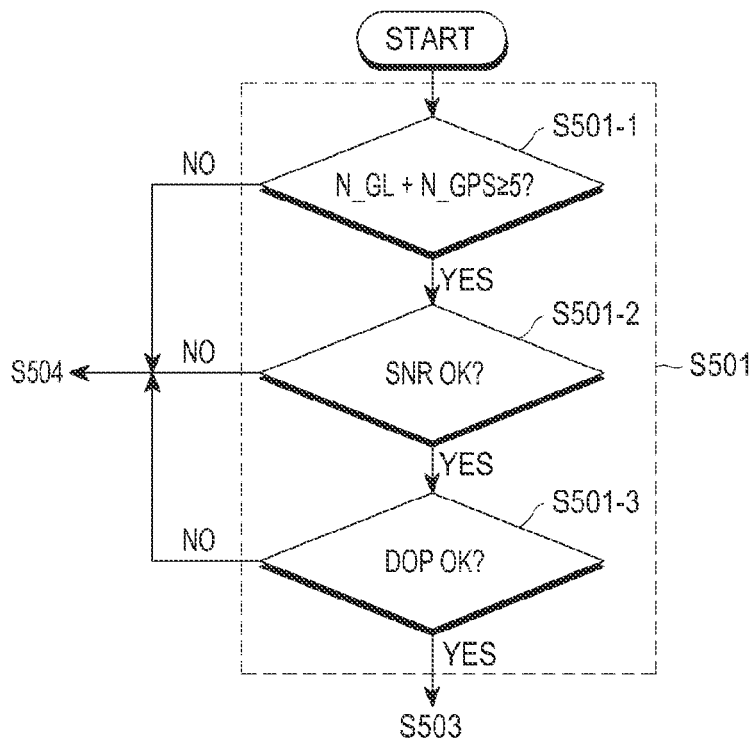
FIG. 6 is a flowchart illustrating examples of predetermined criteria for use in determining whether to perform dual-mode calibration, according to an embodiment of the present invention.

Referring now to FIG. 6, various calibration criteria are illustrated according to an embodiment of the present invention. The method steps in FIG. 6 can be used in step S501 of FIG. 5 to determine whether to perform calibration. In step S501-1, it is determined whether the minimum total number of first and second sources is available. In step S501-2, it is determined whether the signal-to-noise ratios SNRs of the received signals are above a minimum threshold level. That is, if not all of the required signals can be reliably distinguished above the background noise, calibration may not be possible. In step S501-3, it is determined whether the dilution-of-precision DOP is within acceptable limits. For example, all or any of the horizontal DOP (HDOP), vertical DOP (VDOP), positional DOP (PDOP) and time DOP (TDOP) may be compared to predetermined acceptable limits before determining whether to proceed with calibration.

Applying predetermined criteria before executing the calibration method can avoid systematic errors being introduced into subsequent position fixes as a result of the switching time being poorly calculated, for example due to weak signals or poor dilution of precision when obtaining the value of $\Delta t_i$.

Although embodiments of the present invention have been described with reference to Global Navigation Satellite Systems (GNSS) such as GPS and GLONASS, the present invention is not limited to use in dual-mode receivers for use specifically with GPS and GLONASS systems. In other embodiments, the receiver may be configured to receive positioning signals from other satellite navigation systems, or may be configured to receive positioning signals from sources other than satellites. For example, a receiver may be configured to receive WiFi, Basestation, eLoran, TV and/or DAB positioning signals from a plurality of sources, which could be ground-based sources rather than orbiting satellites.

Furthermore, although embodiments of the present invention have been described in relation to switching between first sources and second sources in different navigation systems, in some embodiments the first and second sources may both be part of the same navigation system but transmit signals in different frequency bands. For example, as shown in FIG. 3 the GLONASS system uses two frequency bands. Embodiments of the present invention may therefore also find use in single-mode receivers which are required to switch between different frequency ranges, by enabling the switching time to be estimated and compensated to improve positioning accuracy.

Embodiments of the present invention have been described in which the switching time between two frequency bands can be estimated and used to compensate pseudoranges to provide more accurate positioning. Another advantage of this approach is that in cases where there is a clock offset between the first and second sources, for example where GPS and GLONASS satellites are used and the GPS and GLONASS clocks are not synchronized, the clock offset can be included in the value obtained for the switching time, and automatically compensated for when compensating the pseudoranges for the switching delay.

While certain embodiments of the present invention have been described above, a person skilled in the art will understand that many variations and modifications are possible without departing from the scope of the invention as defined in the accompanying claims.

What is claimed:

1. A method for receiving positioning signals from a plurality of first sources in a first frequency range in a receiver, the method comprising the steps of:

receiving signals in a second frequency range different from the first frequency range;

receiving positioning signals from a plurality of second sources in the second frequency range at the receiver;

calculating time offset information related to a switching time taken to switch the receiver between the first and second frequency ranges; and compensating for the switching time, based on the calculated time offset information.

2. The method of claim 1, further comprising:

obtaining predicted pseudoranges for each of the plurality of first sources and the plurality of second sources;

obtaining compensated pseudoranges for each of the plurality of second sources based on the time offset information and the predicted pseudorange for the source; and obtaining location coordinates of the receiver based on the compensated pseudoranges for the plurality of second sources and the predicted pseudoranges for each of the plurality of first sources.

3. The method of claim 2, wherein each positioning signal includes information about a transmission time at which a signal was transmitted, and wherein if the received positioning signals from the first and second sources were transmitted at different times, the pseudoranges are predicted based on positions of the first and second sources at the transmission time among the received positioning signals.

4. The method of claim 1, further comprising:

storing information about the time offset information; and periodically obtaining updated location coordinates of the receiver based on the stored time offset information.

5. The method of claim 1, further comprising:

determining whether to calculate the time offset information, based on whether predetermined criteria are fulfilled.

6. The method of claim 5, wherein the predetermined criteria includes whether a minimum total number of first and second sources are available, whether the received positioning signals from the plurality of first and second sources have a minimum signal-to-noise ratio (SNR) value, and whether a dilution of precision, based on a current geometric arrangement of the receiver and the first and second sources, is less than or equal to a predetermined maximum value.

7. The method of claim 6, wherein if two-dimensional location coordinates are to be obtained for the receiver, the minimum total number of available first and second sources is four, and if three-dimensional location coordinates are to be obtained for the receiver, the minimum total number of available first and second sources is five.

8. The method of claim 1, wherein the plurality of first sources are satellites in a first navigation system, and the plurality of second sources are satellites in a second navigation system.

9. The method of claim 8, wherein one of the first and second satellite navigation systems is the Global Positioning System (GPS), and the other one of the first and second satellite navigation systems is the Global Orbiting Navigational Satellite System (GLONASS).

10. The method of claim 1, wherein the plurality of first sources and the plurality of second sources are satellites in the same satellite navigation system, and signals from the plurality of first sources are received in a different frequency band from signals from the plurality of second sources.

11. A computer-readable storage medium storing a computer program which, when executed on a processor, causes the processor to perform a method for receiving positioning signals from a plurality of first sources in a first frequency range at a receiver, the method comprising the steps of:

receiving signals in a second frequency range different from the first frequency range;

receiving positioning signals from a plurality of second sources in the second frequency range at the receiver;

calculating time offset information related to a switching time taken to switch the receiver between the first and second frequency ranges; and compensating for the switching time, based on the calculated time offset information.

12. A receiver for receiving positioning signals, the receiver comprising:

a receiving module for receiving positioning signals, the receiving module being arranged to receive the positioning signals from a plurality of first sources in a first frequency range and from a plurality of second sources in a second frequency range different from the first frequency range, and being configured to switch between the first and second frequency ranges; and a processing module configured to calculate time offset information related to a switching time taken to switch the receiver between the first and second frequency ranges, and compensate for the switching time, based on the calculated time offset information.

13. The receiver of claim 12, wherein the processing module obtains predicted pseudoranges for each of the plurality of first sources and the plurality of second sources, obtains compensated pseudoranges for each of the plurality of second sources based on the time offset information and the predicted pseudorange for that source, and obtains location coordinates of the receiver based on the compensated pseudoranges for the plurality of second sources and the predicted pseudoranges for each of the plurality of first sources.

14. The receiver of claim 13, wherein each positioning signal includes information about a transmission time at which the signal was transmitted, and wherein if the received positioning signals from the first and second sources were transmitted at different times, the processing module predicts the pseudoranges based on positions of the first and second sources at the transmission time among the received positioning signals.

15. The receiver of claim 12, wherein the receiver stores the information about the time offset information and periodically obtains updated location coordinates of the receiver based on the stored time offset information.

16. The receiver of claim 12, wherein the processing module determines whether to calculate the time offset information, based on whether predetermined criteria are fulfilled.

17. The receiver of claim 16, wherein the predetermined criteria includes whether a minimum total number of first and second sources are available, whether the received positioning signals from the plurality of first and second sources have a minimum signal-to-noise ratio (SNR) value, and whether a dilution of precision, based on a current geometric arrangement of the receiver and the first and second sources, is less than or equal to a predetermined maximum value.

18. The receiver of claim 17, wherein if two-dimensional location coordinates are to be obtained for the receiver, the minimum total number of available first and second sources is four, and if three-dimensional location coordinates are to be obtained for the receiver, the minimum total number of available first and second sources is five.

19. The receiver of claim 12, wherein the plurality of first sources are satellites in a first satellite navigation system, and the plurality of second sources are satellites in a second navigation system.

20. The receiver of claim 19, wherein one of the first and second satellite navigation systems is the Global Positioning System (GPS), and the other one of the first and second satellite navigation systems is the Global Orbiting Navigational Satellite System (GLONASS).

21. The receiver of claim 12, wherein the plurality of first sources and the plurality of second sources are satellites in the same satellite navigation system, and signals from the plurality of first sources are received in a different frequency band from signals from the plurality of second sources.

* * * * *